US00RE35455E

United States Patent [19]

Sakurai et al.

[11] E Patent Number: Re. 35,455

[45] Reissued Date of Patent: Feb. 18, 1997

[54] CHECKOUT APPARATUS

[75] Inventors: Haruo Sakurai; Kazuo Yamamoto; Mitunori Kono, all of Shizuoka-ken; Hideo Tanaka, Numazu, all of Japan

[73] Assignee: Kabushiki Kaisha TEC, Tokyo, Japan

[21] Appl. No.: 430,184

[22] Filed: Apr. 27, 1995

Related U.S. Patent Documents

Reissue of:

[64] Patent No.: 5,178,234
Issued: Jan. 12, 1993
Appl. No.: 668,768
Filed: Mar. 13, 1991

U.S. Applications:

[63] Continuation of Ser. No. 146,215, Nov. 1, 1993, abandoned.

[30] Foreign Application Priority Data

Mar. 15, 1990 [JP] Japan ..... 2-65456
Apr. 20, 1990 [JP] Japan ..... 2-104684

[51] Int. Cl.[6] ..... A47F 9/04

[52] U.S. Cl. ..... 186/61; 186/68; 209/556

[58] Field of Search ..... 186/61–69; 235/383, 235/385; 209/556

[56] References Cited

U.S. PATENT DOCUMENTS

| | | | |
|---|---|---|---|
| 3,083,791 | 4/1963 | Shoffner | 186/65 |
| 4,114,727 | 9/1978 | Joseloff | 186/63 |
| 4,558,212 | 12/1985 | Hampson | 235/383 |
| 4,676,343 | 6/1987 | Humble et al. | 186/61 |
| 4,766,296 | 8/1988 | Barth | 235/386 |
| 4,792,018 | 12/1988 | Humble et al. | 186/61 |
| 5,042,619 | 8/1991 | Kohno | 186/61 |

FOREIGN PATENT DOCUMENTS

| | | |
|---|---|---|
| 899019 | 6/1984 | Belgium . |
| 61-46591 | 3/1986 | Japan . |
| 63-298500 | 12/1988 | Japan . |
| 2217887 | 11/1989 | United Kingdom . |

*Primary Examiner*—F. J. Bartuska
*Attorney, Agent, or Firm*—Frishauf, Holtz, Goodman, Langer & Chick

[57] ABSTRACT

A checkout apparatus comprises a reading section for reading article codes of articles, and a first feeding section for feeding the articles whose article code are read by the reading section. The checkout apparatus further comprises a distributing section for distributing the articles fed from the first feeding section to one of first and second directions, a second feeding section for feeding the articles distributed in the first direction by the distributing section to a packaging area, a stock section for stocking the articles distributed in the second direction by the distributing section within a stock area separated from the packaging area, and a processing section for checking whether or not an article fed by the first feeding section coincides with an article whose article code is read by the reading section, and for controlling the distributing section so as to distribute the article fed from the first feeding section in the first direction when the checked articles are coincident with each other and in the second direction when the checked articles are not coincident with each other.

32 Claims, 9 Drawing Sheets

85

| CODE | ARTICLE NAME | UNIT PRICE | WEIGHT |
|---|---|---|---|
| | | | |
| | | | |
| | | | |

| | | | |
|---|---|---|---|
| | | | |
| | | | |

F I G. 6

85

| CODE | ARTICLE NAME | UNIT PRICE | WEIGHT |
|---|---|---|---|
| | | | |
| | | | |
| | | | |
| | | | |
| | | | |

FIG. 8

86

| CODE | ARTICLE NAME | UNIT PRICE | WEIGHT | TRANSACTION TIME |
|---|---|---|---|---|
| | | | | |
| | | | | |

FIG. 9

CHECKOUT APPARATUS

Matter enclosed in heavy brackets [ ] appears in the original patent but forms no part of this reissue specification; matter printed in italics indicates the additions made by reissue.

*This application is a Continuation of Ser. No. 08/146,215 filed Nov. 1, 1993, now abandoned, which is a Reissue of Ser. No. 07/668,768 filed Mar. 13, 1991, now U.S. Pat. No. 5,178,234.*

BACKGROUND OF THE INVENTION

1. Field of the Invention

This invention relates to a checkout apparatus for checking sales articles, and more particularly to a checkout apparatus used in a large-scale store such as a supermarket.

2. Description of the Related Art

Conventionally, when a customer has brought a shopping basket containing articles which are not yet registered for sales in front of the scanner, the operator takes out the non-registered article from the shopping basket, uses the scanner to read the bar code representing the article code assigned to the article and then puts the article into an empty shopping basket set behind the scanner. After the operator settles the account when all of the non-registered articles have been registered into the cash resister, the operator puts another empty basket behind the scanner. The customer brings the shopping basket containing the registered articles to the packaging table and puts the articles into a packaging bag.

However, the operator may have the following problems: A1) Since it is necessary to take out the articles one at a time from the shopping basket in which a large number of non-registered articles are packed at random, it is difficult to take out them from the basket, and particularly, when fragile articles are received in the basket, it becomes further difficult to rapidly take out them. A2) Since it is necessary to put the articles which have been taken out from the shopping basket into another shopping basket in such an order that the fragile articles may be put on other articles which are difficult to be damaged, it is difficult to rapidly deal with the articles. A3) It is required to set an empty shopping basket behind the scanner for the next customer.

Further, the customer may have the following problems: B1) The waiting time becomes long because the operator has the above problems. B2) It is necessary to take the heavy shopping basket containing registered articles to the packaging table after the settlement. B3) Since it is necessary to take out the registered articles from the shopping basket on the packaging table and then put the fragile articles on the other articles which are not fragile into a packaging bag, it takes a long time for packaging.

In order to solve the above problems, a checkout apparatus disclosed in Japanese Patent Disclosure No. 61-46591 has been proposed. The checkout apparatus includes a reader (or scanner) which is used by the customer to read the bar code of an article, a feed conveyor for feeding the article whose bar code is read by the reader, a weight measuring device for measuring the weight of an article set on the feed conveyor, a feed-out conveyor disposed continuously to the rear end of the feed conveyor, for feeding the article whose weight is measured, a packaging section disposed at the end portion of the feed-out conveyor, and a settlement section at which the customer having packaged the articles at the packaging section settles the accounts.

Therefore, when the customer has come to the check-out position after having put articles to be purchased into a shopping cart, he takes out the articles one at a time from the shopping cart, reads the bar code of the article by use of the reader, and then puts it on the feed conveyor.

When the bar code of the article is correctly read by the reader, the checkout apparatus reads out weight data corresponding to a code input from the reader from a memory which stores weight data of transaction articles classified by the article codes and compares the readout weight data with the weight data of the article which is set on the feed conveyor and whose weight is measured by the measuring device.

In this case, if the compared weight data items are coincident with each other, it is determined that the article whose article code is read by the reader is the same as that which is being fed and the article is fed to the packaging section by driving the feed conveyor and feed-out conveyor in a forward direction.

If the compared weight data items are not coincident with each other, the article is returned to the reader by driving the feed conveyor and feed-out conveyor in a reverse direction. The customer again operates the reader to read the bar code of the article which has been returned to the reader.

Therefore, in a case where the bar code cannot be read by means of the reader (including a case wherein the customer directly sets the article onto the feed conveyor without effecting the bar code reading operation), or in a case where the customer sets an article different from the article whose bar code is read by use of the reader on the feed conveyor, the article is returned to the reader and therefore erroneous registration and a dishonest act of the customer can be prevented.

In a case where the customer operates the reader to read the bar code attached to an article, it frequently occurs that the bar code cannot be correctly read because the customer is not used to the reading operation. Further, there is a possibility that the bar code cannot be correctly read because of stain on or breakage of the bar code label.

In this condition, the weight data of the article whose weight is measured by the measuring device does not coincide with the weight data read out from the memory and the article is returned to the reader. As a result, in this period of time, it becomes impossible to operate the reader so as to read the bar code of a next article.

In addition, even if the reading operation is effected again and when the bar code is not correctly read, the operator who is in charge of the settlement is called to come to the position of the reader and the operator cannot concentrate all his energy on the settlement operation.

SUMMARY OF THE INVENTION

Accordingly, an object of this invention is to provide a checkout apparatus which permits the article code reading operation to be efficiently effected and permits an article to be easily registered even when the article which has been fed does not coincide with an article which has been subjected to the reading operation.

The object is achieved by a checkout apparatus which comprises a reading section for reading article codes of articles, a first feeding section for feeding the articles whose article code are read by the reading section, a distributing section for distributing the articles fed from the first feeding section to one of first second directions, a second feeding section for feeding the articles distributed in the first direction by the distributing section to a packaging area, a stock section for stocking the articles distributed in the second direction by the distributing section within a stock area separated from the packaging area, and processing section for checking whether or not an article fed by the first feeding section coincides with an article whose article code is read by the reading section, and for controlling the distributing section so as to distribute the article fed from the first feeding section in the first direction when the checked articles are coincident with each other and in the second direction when the checked articles are not coincident with each other.

In the checkout apparatus, even if the bar code an article cannot be read by the reading section or an article different from the article whose bar code is read by the reading section is set on the first feeding section, the article is not returned to the reading section and therefore erroneous registration and a dishonest act of the customer can be prevented.

BRIEF DESCRIPTION OF THE DRAWINGS

FIG. 6 is a memory map of an article data file stored in a RAM shown in FIG. 5;

FIG. 8 is a memory map of an article data file stored in a RAM of the second embodiment which is similar to that shown in FIG. 5;

FIG. 9 is a memory map of an read article file stored in the RAM of the second embodiment, together with the article data file shown in FIG. 8.

DETAILED DESCRIPTION OF THE PREFERRED EMBODIMENTS

There will now be described a checkout apparatus according to a first embodiment of this invention with reference to FIGS. 1 to 6.

Figure 1:
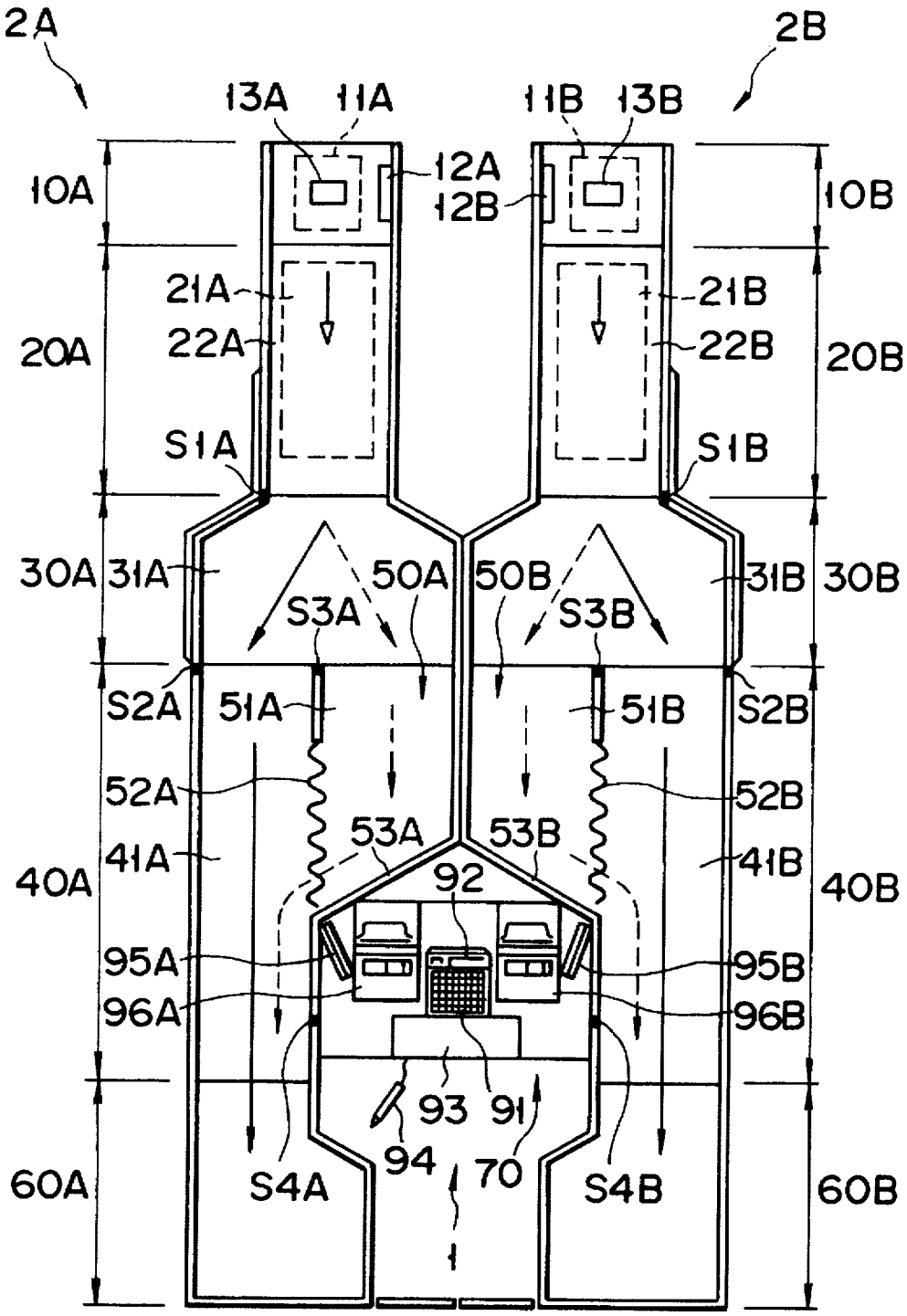
FIG. 1 is a plan view of a checkout apparatus according to a first embodiment of the present invention.
Figure 2:
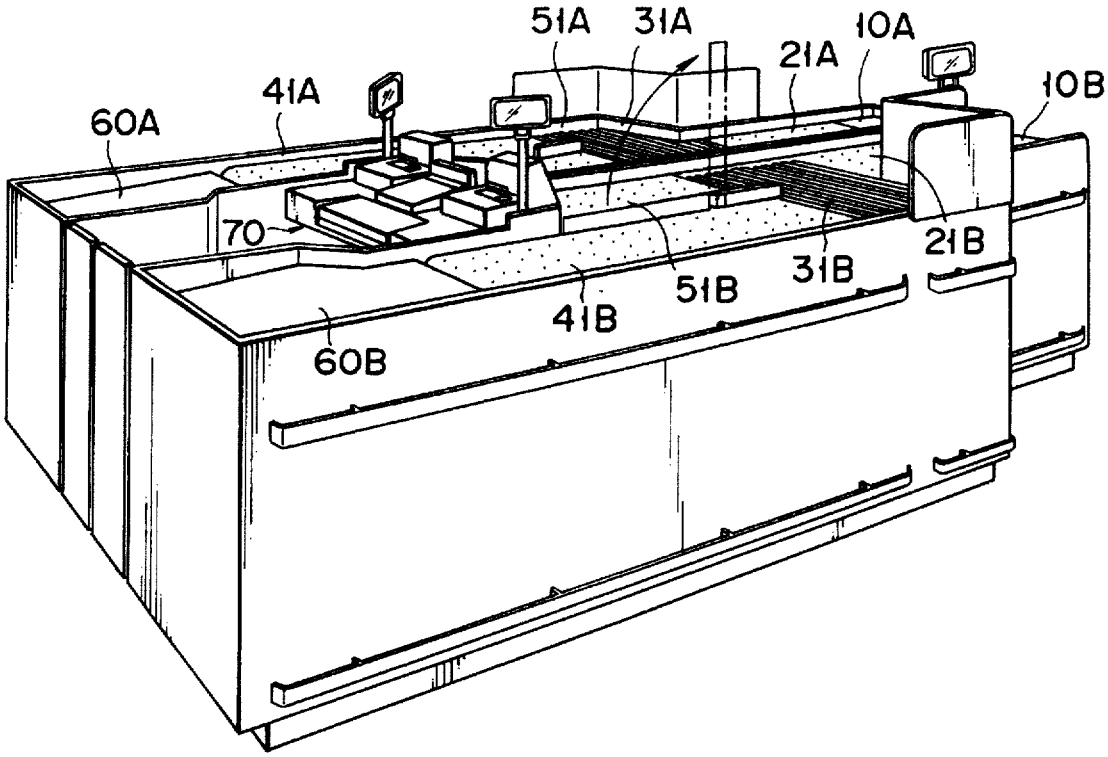
FIG. 2 is a perspective view of the checkout apparatus.

FIG. 1 is a plan view of the checkout apparatus and FIG. 2 is a perspective view of the apparatus. The checkout apparatus is constituted by two checkout lanes 2A and 2B disposed in parallel on both sides of a settlement section 1.

A POS (point of sales) terminal 70 is arranged on the settlement section 1. The checkout lanes 2A and 2B are respectively constituted by reading sections 10A and 10B, feed-in sections 20A and 20B, distributing sections 30A and 30B, feed-out sections 40A and 40B, stock sections 50A and 50B serving as stocking means, and packaging sections 60A and 60B.

Figure 3:
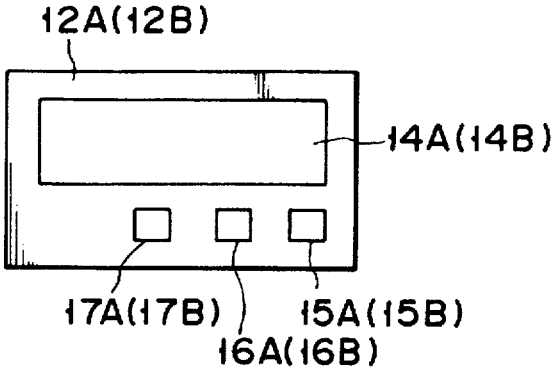
FIG. 3 is a view showing the construction of an operation panel shown in FIG. 1.

The reading sections 10A and 10B respectively include operation panels 12A and 12B and scanners 11A and 11B serving as reading means for reading bar codes representing article codes of articles. The scanners 11A and 11B have horizontal windows 13A and 13B, and each of the scanners scans a laser beam on an area above the scanner via a corresponding one of the reading windows 13A and 13B and reads a bar code by receiving light reflected from the bar code of an article moving across the area. Further, as shown in FIG. 3, display units 14A and 14B, start switches 15A and 15B, stop switches 16A and 16B, and call switches 17A and 17B for calling the operator are disposed on the operation panels 12A and 12B.

Feed-in conveyors 21A and 21B serving as feeding means for feeding articles which have been subjected to the reading operation in the scanners 11A and 11B to the distributing sections 30A and 30B and weighing scales 22A and 22B for measuring the weight of articles disposed on the feed-in conveyors 21A and 21B are respectively disposed in the reading sections 20A and 20B.

The distributing sections 30A and 30B include distributing conveyors 31A and 31B serving as distributing means and each including first and second roller units intersecting each other. The first roller unit has shafts extending in a second direction and rollers mounted on the shafts, and the second roller unit has shafts extending in the first direction and rollers mounted on the shafts. The first roller units of distributing sections 30A and 30b are driven to feed articles to the feed-out section 40A and 40B. The second roller units of the distributing sections 30A and 30B are driven to feed articles to the stock sections 50A and 50B. First sensors S1A and S1B for detecting that articles are moved from the feed-in conveyors 21A and 21B are disposed on the entrance portions of the distributing conveyors 31A and 31B. Second sensors S2A and S2B for detecting that articles are moved from the distributing conveyors 31A and 31B to the feed-out sections 40A and 40B and third sensors S3A and S3B for detecting that articles are moved from the distributing conveyors 31A and 31B to the stock sections 40A and 50B are disposed on the exit portions.

The feed-out sections 40A and 40B include feed-out conveyors 41A and 41B serving as feed-out means for passing the articles distributed in the first direction by the distributing conveyors 31A and 31B through portions beside the settlement section 1 and further feeding the article to the packaging sections 60A and 60B. On the half-way of the feed-out conveyors 41A and 41B, that is, near the settlement section 1, fourth sensors S4A and S4B for detecting the presence or absence of the article are disposed.

The stock sections 50A and 50B are used to stock articles distributed in the second direction by the distributing conveyors 31A and 31B and disposed in parallel to and inside the feed-out conveyors 41A and 41B. Further, the stock sections 50A and 50B include stock conveyors 51A and 51B for feeding the articles distributed in the second direction by the distributing conveyors 31A and 31B to the front sides of the settlement section 1. At the end portions of the stock conveyors 51A and 51B, stopper walls 53A and 53B are disposed to guide articles to gates 52A and 52B. The gates 52A and 52B are disposed, at the boundaries between the stock conveyors 51A and 51B and the feed-out conveyors 41A and 41B, to be freely moved in a vertical direction into an open and close state, as shown in FIG. 2. The gates 52A and 52B is used to control the movement of articles to the feed-out conveyors 41A and 41B. The stocked articles is moved into the feed-out conveyors 41A and 41B when the gates 52A and 52B are set to the open state.

Figure 4:
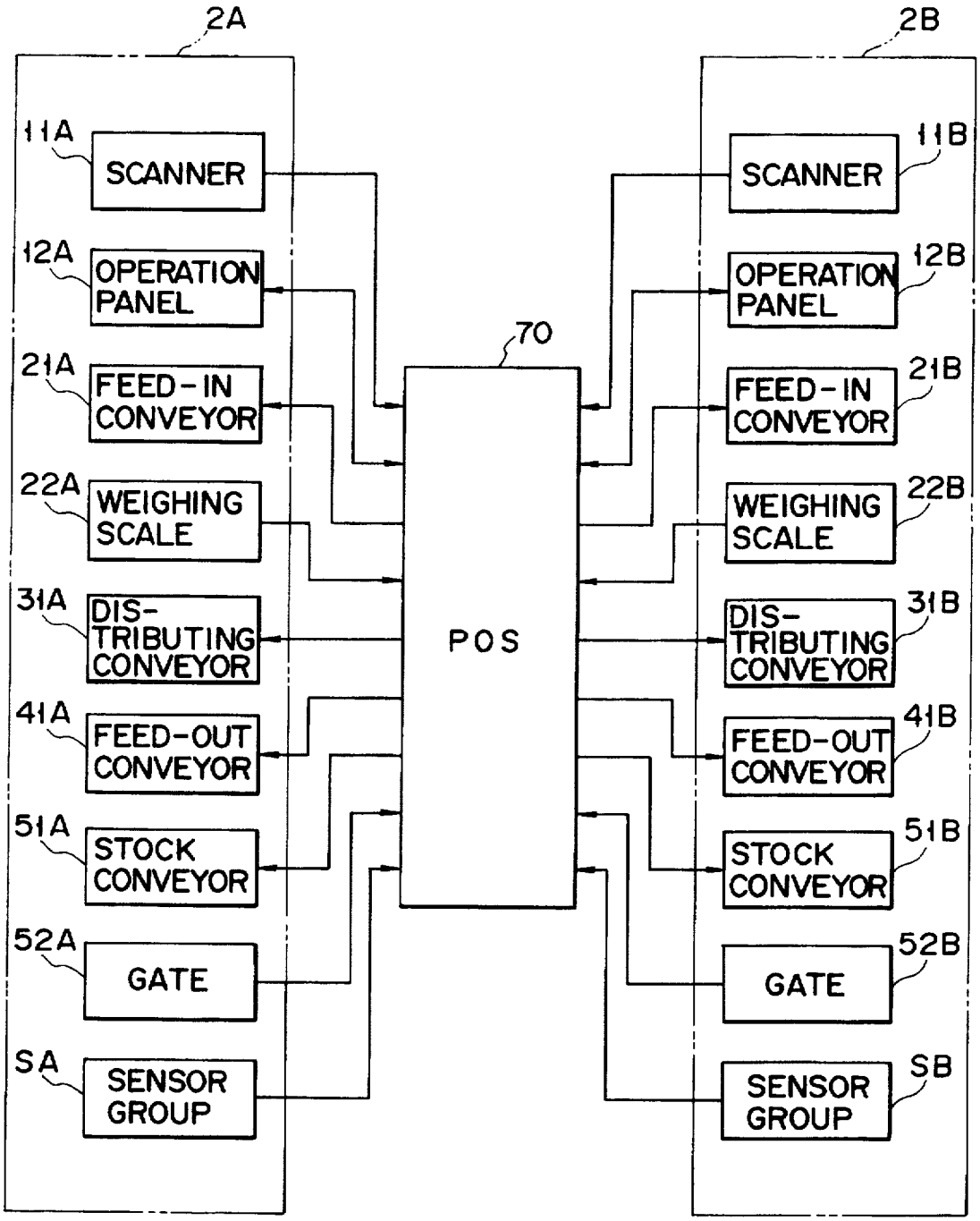
FIG. 4 is a block diagram showing the circuit of the checkout apparatus.

FIG. 4 shows the circuit construction of the checkout apparatus.

As shown in FIG. 4, the checkout apparatus comprises a POS terminal 70 connected to constituent elements of the checkout lane 2A, i.e., the scanner 11A, the operation panel 12A, the feed-in conveyors 21A, the weighing scale 22A, the distributing conveyor 31A, the feed-out conveyor 41A, the stock conveyor 51A, the gate 52A, and the sensor group SA (sensors S1A to S4A), and to constituent elements of the checkout lane 2B, i.e., the scanner 11B, the operation panel 12B, the feed-in conveyors 21B, the weighing scale 22B, the distributing conveyor 31B, the feed-out conveyor 41B, the stock conveyor 51B, the gate 52B, and the sensor group SB (the sensors S1B to S4B).

Figure 5:
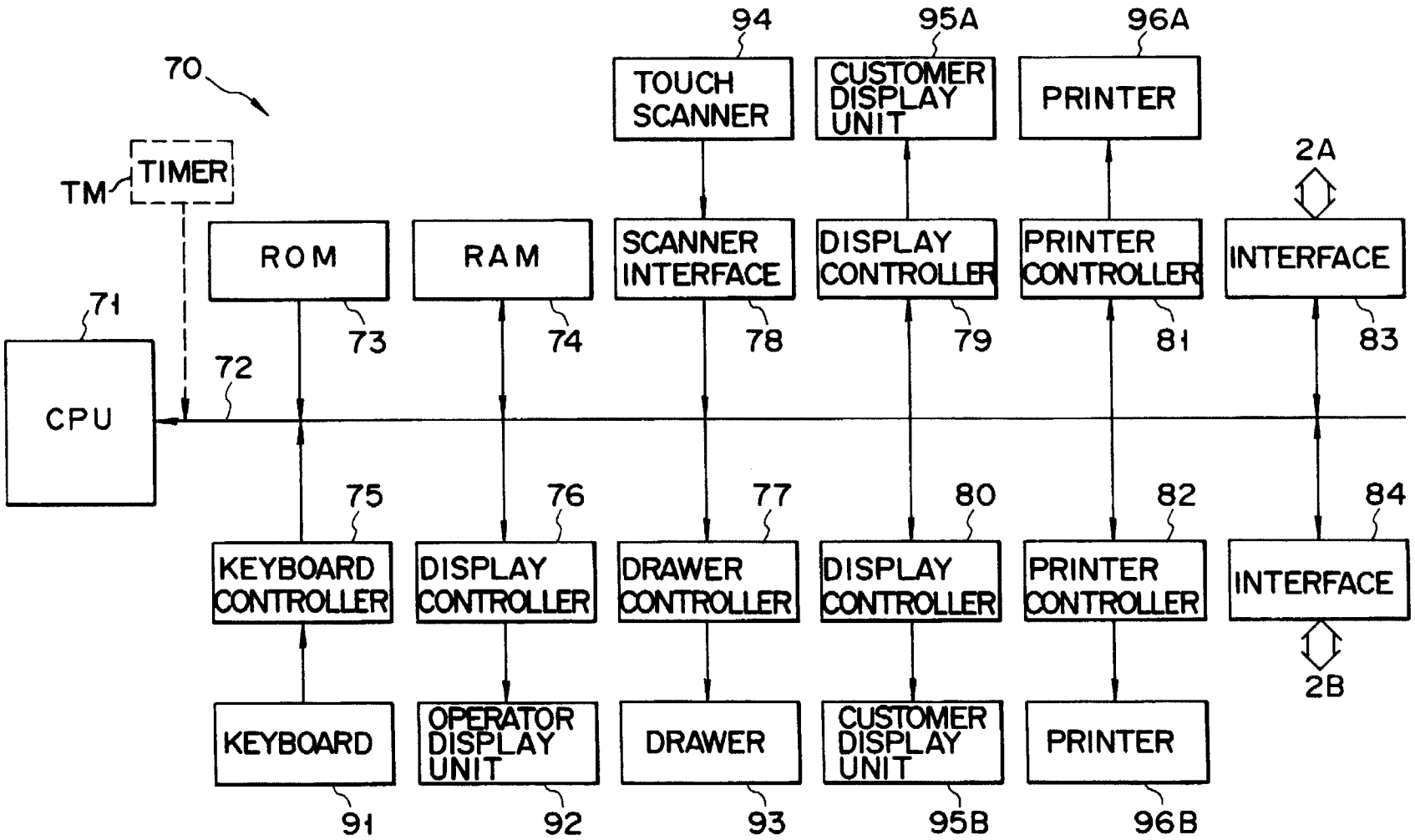
FIG. 5 is a block diagram showing the circuit of a POS terminal shown in FIG. 4.
Figure 7:
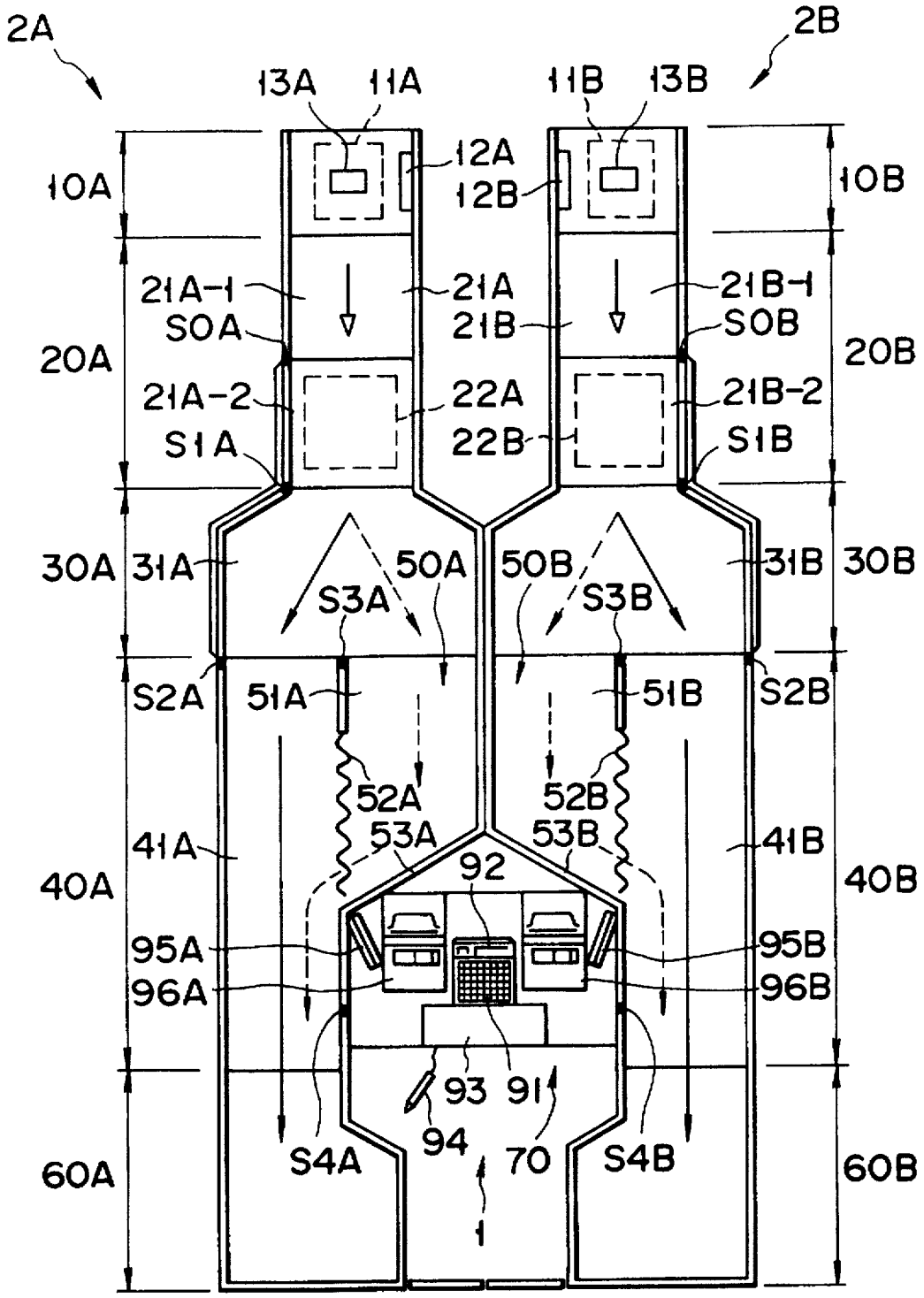
FIG. 7 is a plan view of a checkout apparatus according to a second embodiment of the present invention which is similar to the first embodiment.

FIG. 5 shows the circuit construction of the POS terminal 70. The POS terminal includes a CPU 71, A ROM 73 storing a control program, a RAM 74 for storing registration data and the like, a keyboard controller 75, display controllers 76, 79 and 80, a drawer controller 77, a scanner interface 78, printer controllers 81 and 82, and interfaces 83 and 84 with respect to the respective constituent elements in the checkout lanes 2A and 2B are connected to the CPU 70 via an address data bus 72.

The RAM 74 has an area for storing registration data and an area for storing an article data file shown in FIG. 6. The article data file is previously provided as a table for article data of articles dealt with in the store. Each item of article data includes an article code, an article name, a unit price, and weight data with respect to a corresponding article.

The keyboard controller 75 is connected to keyboard 91 which is operated by the operator, the display controller 76 is connected to an operator display unit 92, the drawer controller 77 is connected to a drawer 93, and the scanner interface 78 is connected to a touch scanner 94 which is operated by the operator to read the bar code of the article. Further, the display controllers 79 and 80 and printer controllers 81 and 82 are connected to customer display units 95A and 95B and printers 96A and 96B respectively provided in the checkout lanes 2A and 2B.

The CPU 71 controls the above constituent elements based on the control program stored in the ROM 73. For example, when the scanner 11A or 11B reads the bar code, weight data corresponding to the code thus read is read out from the article data file 85 and then the readout weight data is compared with weight data measured by the weighing scale 22A or 22B to determine whether or not the compared weight data items are coincident with each other. That is, the CPU 71 and ROM 73 constitute checking means for checking whether or not an article fed by the feed-in conveyor 21A or 21B coincides with an article whose article code is read by the scanner 11A or 11B. The distributing conveyors 31A and 31B are controlled according to the comparison result to distribute the article in one of different directions.

Next, the operation of the checkout apparatus is explained.

When the customer comes to a position of the reading section 10A, for example, after having put articles to buy into the shopping cart, the customer operates the operation panel 12A according to the massages displayed on the display unit 14A. First, the start switch 15A is depressed. Then, the CPU 71 of the POS terminal 70 drives the conveyors 21A, 31A and 41A and then displays the massage "Please read bar codes" on the display unit 14A.

According to this massage, the customer takes out the articles one at a time from the shopping cart, passes the article along the scanner 11A with the bar code plane of the article set to face the reading window 13A. and then puts the article on the feed-in conveyor 21A. At this time, if the scanner 11A correctly reads the bar code, the CPU 71 reads out the article data of an article corresponding to the thus read bar code from the article data file 85 and checks whether or not the weight data included in the readout article data coincides with the weight data of an article which is set on the feed-in conveyor 41A by the customer and measured by the weighing scale 22A. If the scanner 11A cannot correctly read the bar code or when the customer directly sets the article on the feed-in conveyor 21A without effecting the reading operation, article data is not read out from the article data file 85.

In this case, if the compared weight data items are coincident with each other, the distributing conveyor 31A is controlled to feed the article on the distributing conveyor 31A to the feed-out conveyor 41A when the article on the feed-in conveyor 21A is moved onto the distributing conveyor 31A, that is, when the first sensor S1A is set from the ON state to the OFF state and the second and third sensors S2A and S3A are not set in the ON state. When the article is fed to the feed-out conveyor 41A by means of the distributing conveyor 31A, the article is fed to pass by the settlement section 1 by means of the feed-out conveyor 41A and further fed to the packaging section 60A.

On the other hand, if the compared weight data items are not coincident with each other, that is, in a case where the scanner 11A cannot correctly read the bar code, where the customer directly sets the article on the feed-in conveyor 21A without effecting the reading operation, or where the customer sets an article which is different from an article which is subjected to the reading operation by use of the scanner 11A on the feed-in conveyor 21A, then the distributing conveyor 31A is controlled to feed the article on the distributing conveyor 31A to the stock conveyor 51A when the article on the feed-in conveyor 21A is moved onto the distributing conveyor 31A.

When the article is fed to the stock conveyor 51A by means of the distribution conveyor 31A, the third sensor S3A is turned on. Then, the CPU 71 drives the stock conveyor 51A for a preset period of time (which is longer than a period of time required for the article set on the stock conveyor 51A to reach the stopper wall 53A). As a result, the article is fed into between the stopper wall 53A and the gate 52A and stocked there.

If an article lies on the distributing conveyor 31A when an article on the feed-in conveyor 21A has reached the position of the first sensor S1A, the feed-in conveyor 21A is stopped until the article on the distributing conveyor 31A is fed out therefrom.

In this way, after the reading operation for all of the articles is completed, the customer depresses the stop switch 16A. Then, the CPU 71 stops the operation of the conveyors other than the stock conveyor 51A (i.e., the conveyors 21A, 31A and 34A). After this, the customer goes to the settlement section 1. The operator at the settlement section 1 settles the accounts of the articles registered for the customer.

At this time, the operator directly takes out an article stocked if the article is stocked in the stock section 50A and uses the touch scanner 94 to read the bar code of the article while confirming the customer's agreement, and then puts the article into the packaging section 50A. That is, the article is additionally registered.

If a large number of articles are stocked or if heavy articles are stocked and it is difficult to take out the article, the gate 52A is opened. Then, the CPU 71 drives the stock conveyor 51A and feed-out conveyor 41A and then stops the conveyors 51A and 41A when the fourth sensor S4A is turned on. As a result, an article stocked in the stock section 50A is fed from the stock conveyor 51A to the feed-out conveyor 41A and then stopped when it has reached a portion just beside the settlement section 1. Therefore, the operator takes up the article which has reached the portion just beside the settlement section 1 and uses the touch scanner 94 to read the bar code of the article while confirming the customer's agreement and then puts the article into the packaging section 60A.

In the settlement, the printer 96A is driven to issue a receipt of the registered articles and the operator hands it over to the customer and receives money. After the settlement, the customer goes to the packaging section 60A and puts the articles into a packaging bag.

As described above, in this embodiment, weight data corresponding to an article whose the article code is read by the scanner 11A or 11B is compared with weight data measured by the weighing scale 22A or 22B and the article is fed into the feed-out conveyor 41A or 41B when the compared weight data items are coincident with each other, and the article is stocked in the stock section 50A or 50B when the compared weight data items are not coincident with each other. Therefore, even when the compared weight data items are not coincident with each other, the reading operation for the next article can be continuously effected, and thus the reading operation can be effected efficiently.

That is, even when the bar code cannot be correctly read because the customer is not accustomed to the reading operation or when the bar code cannot be read because the bar code is damaged or stained, the reading operation for the next article can be continuously effected so that the reading operation can be efficiently effected.

Further, since the stock sections 50A and 50B are arranged inside the feed-out conveyors 41A and 41B and the stock sections 50A and 50B are so arranged as to feed the article supplied thereto to the front portion of the settlement section 1 and stock the article there, the operator at the settlement section 1 can directly take out the article in the stock section 50A or 50B and additionally register the article.

If a large number of articles are stocked or heavy articles are stocked and it is difficult to take out the article, the operator can easily and additionally register the articles without moving from the settlement section 1 since the articles stocked in the stock sections 50A and 50B can be fed to portions just beside the settlement section 1 by opening the gates 52A and 52B and driving the stock conveyors 50A and 50B and the feed-out conveyors 41A and 41B. At this time, since the stock sections 50A and 50B are arranged inside the feed-out conveyors 41A and 41B of the checkout lanes 2A and 2B, the article which is fed from the stock section 50A or 50B to the feed-out conveyor 41A or 41B passes by the settlement section 1 and therefore the operator can take out the article from the feed-out conveyor 41A or 41B and additionally register the article.

For the additional registration, the bar code of the article is read by use of the touch scanner 94 so that the stocked article can also be easily and additionally registered. If the bar code cannot be read by use of the touch scanner 94 because of breakage of or stain on the bar code, it is possible to input data by key operation on the keyboard 91.

Further, since the checkout lanes 2A and 2B are arranged on both sides of the settlement section 1, the processings for the two lanes can be effected by one person at the settlement section 1. Therefore, the number of operators can be reduced.

In the above embodiment, the article stocked in the stock section 50A or 50B is fed to a portion just beside the settlement section 1 by driving the stock conveyor 51A or 51B and the feed-out conveyor 41A or 41B, but if the stock sections 50A and 50B are arranged near the settlement section 1, the operator at the settlement section 1 can directly take out the article stocked in the stock section 50A or 50B and additionally register the article irrespective of the number of articles and the weight thereof. Therefore, in this case, the gates 52A and 52B and the fourth sensors S4A and S4B can be omitted.

Further, in the above embodiment, the articles are distributed along the right and left paths in the feeding direction of the feed-in conveyors 21A and 21B by the distribution conveyors 31A and 31B, for example, it is possible to arrange the feed-in conveyors 21A and 21B and the feed-out conveyors 41A and 41B on straight lines, respectively, feed the article along the straight line on the feed-in conveyor 21A or 21B, the distribution conveyor 31A or 31B and the feed-out conveyor 41A or 41B when the comparison result indicates the coincidence of the compared weight data items, and change the feeding direction of the article by the distribution section 31A or 31B and feed the article to the stock conveyor 51A or 51B when the comparison result indicates the non-coincidence of the compared weight data items.

Next, a checkout apparatus according to a second embodiment of this invention is explained with reference to FIGS. 7 to 12. The checkout apparatus is formed to have a construction similar to that of the former embodiment except the following points. Accordingly, detail explanation for the same portions is omitted. In the following explanation, the same portions are denoted by the same reference numerals used in the former embodiment.

In the second embodiment, feed-in conveyors 21A and 21B are respectively constituted by first feed-in conveyors 21A-1 and 21B-1 and second feed-in conveyors 21A-2 and 21B-2. Sensors S0A and S0B are respectively disposed between the first and second feed-in conveyors 21A-1 and 21A-2 and between the first and second feed-in conveyors 21B-1 and 21B-2, and units for measuring characteristic data inherent to the article on the second feed-in conveyor, in this example, weight measuring scales 22A and 22B serving as measuring means for measuring weight of the article are disposed on the side of the second feed-in conveyors 21A-2 and 21B-2, respectively.

The CPU 71 is connected to a timer TM for generating present time data. The RAM 74 has an area for storing registration data, an area for storing an article data file shown in FIG. 8, and an area for storing a read article file 86 shown in FIG. 9. The article data file is previously provided as a table for article data of articles dealt with in the store. Each item of article data includes an article code, an article name, a unit price, and weight data with respect to a corresponding article. The read article file is provided for each customer as a table for article data of articles whose bar codes (or article codes) are read by the scanner 11A or 11B. The read article file 86 includes items of transaction time data added to article data items of articles whose article codes are read by the scanner 11A or 11B. Each transaction time data indicates the time at which the article code of a corresponding article is read.

Further, the CPU 71 controls the above constituent elements based on the program stored in the ROM 73. For example, when the scanner 11A or 11B reads the bar code, the CPU 71 executes the process shown by the flowchart of FIG. 10. Further, when weight data from the weighing scale 22A or 22B is changed, the CPU 71 executes the process shown by the flowchart of FIG. 12. In this example, the CPU 7 and the ROM 73 constitute reading means for reading out article data of an article corresponding to the article code from the article data file 85 and storing the data into the read article file 86 each time the article code is read by the scanner 11A or 11B and checking means for checking whether or not the same weight data as the weight data measured by the weighing scale 22A or 22B is stored in the read article file 86. The distribution conveyor 31A or 31B is controlled to distribute the article in one of first and second directions based on the checking result.

Figure 10:
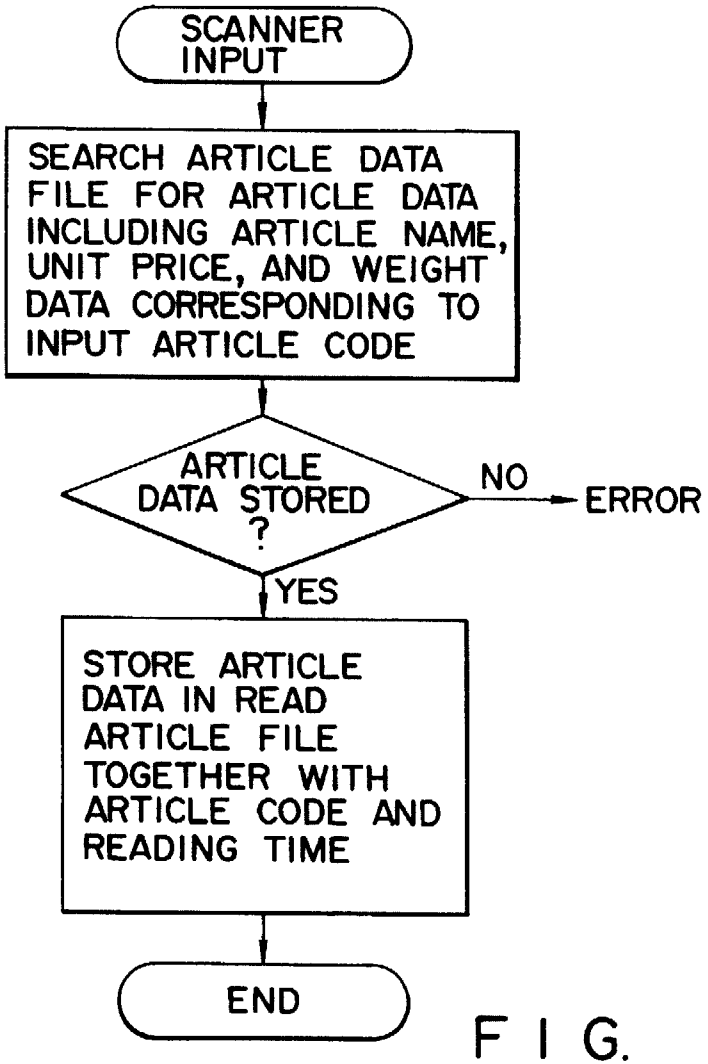
FIGS. 10 to 12 show flowcharts for explaining the operation of the checkout apparatus of the second embodiment.
Figure 11:
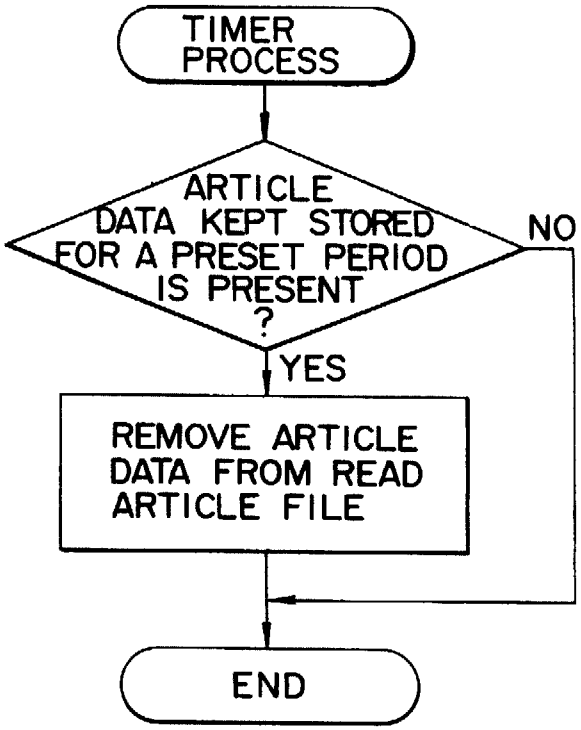
Figure 12:
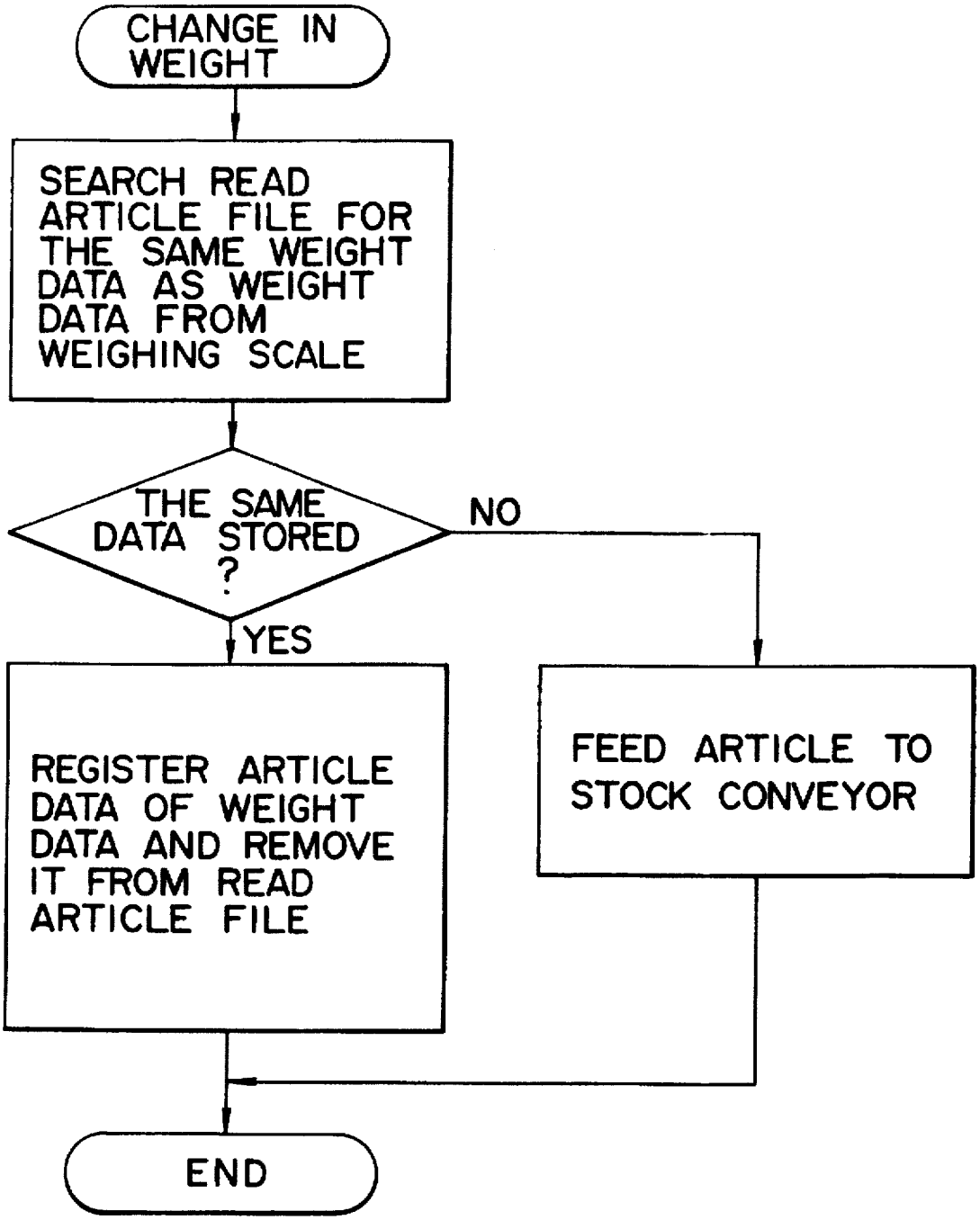

Now, the operation of the checkout apparatus according to the second embodiment is explained with reference to flowcharts of FIGS. 10 to 12.

When the customer comes to a position of the reading section 10A, for example, after having put articles to buy into the shopping cart, the customer effects the operation according to the massage displayed on the display unit 14A of the operation panel 12A. First, the start switch 15A is depressed. Then, the CPU 71 of the POS terminal 70 drives the conveyors 21A, 31A and 41A and then displays the massage "Please read bar codes" on the display unit 14A.

According to this message, the customer takes out the articles one at a time from the shopping cart, passe the article along the scanner 11A with the bar code plane of the article set to face the reading window 13A, and then sets the article on the first feed-in conveyor 21A-1. At this time, the CPU 71 searches the article data file 85 for article data, i.e., an article name, unit price and weight data, corresponding to an input code as shown in the flowchart of FIG. 10 when an article code is input from the scanner 11A, and if the article data is present therein, it stores the above data into the read article file 86 together with transaction time data.

If the scanner 11A cannot correctly read the bar code or when the customer directly sets the article on the feed-in conveyor 21A without effecting the reading operation, corresponding article data cannot be read out from the article data file 85 and therefore no article data is written into the read article file 86. The CPU 71 executes the process shown in the flowchart of FIG. 11 at a regular interval. For example, the CPU 71 checks whether or not data which is kept stored for a preset period of time (which is longer than a period of time from the reading time to the time at which the article has reached the second feed-in conveyor 21A-2 or 21B-2 in the normal operation) among the transaction or reading time data stored in the read article file 86 is present, and when time-over data is detected, the data is removed from the read article file 86 along with a corresponding article data.

The article set on the first feed-in conveyor 21A-1 is fed from the first feed-in conveyor 21A-1 to the second feed-in conveyor 21A-2 add the weight thereof is measured by the weighing scale 22A. Then, the CPU 71 searches the read article file 86 for the same weight data as the weight data from the weighing scale 22A to check whether or not the same weight data is present therein as shown in the flowchart of FIG. 12 when the article is fed into the second feed-in conveyor 21A-2 and the weight data of the weighing scale 22A is changed.

In this case, if the same weight data is present in the read article file 86, registration is effected based on the article data corresponding to the weight data is registered and then the article data is removed from the read article file 86 along with a corresponding transaction time data. When the article on the second feed-in conveyor 21A-2 is moved onto the distribution conveyor 31A, that is, when the first sensor S1A is set from the ON state to the OFF state and the second and third sensors S2A and S3A are not set in the ON state, the distribution conveyor 31A is controlled to to feed the article on the distribution conveyor 31A to the feed-out conveyor 41A. When the article is fed to the feed-out conveyor 41A by the distribution conveyor 31A, the article passes beside the settlement section 1 and is fed to the packaging section 60A by the feed-out conveyor 41A.

In a case where the same weight data is not stored in the read article file 86, that is, in a case where the bar code cannot be correctly read by means of the scanner 11A, where the customer directly sets the article on the feed-in conveyor 21A without effecting the reading operation, or where the customer sets an article different from the article whose bar code is read by use of the scanner 11A on the feed-in conveyor 21A, the distribution conveyor 31A is controlled to feed the article on the distribution conveyor 31A to the stock conveyor 51A when the article on the second feed-in conveyor 21A-2 is moved onto the distribution conveyor 31A.

When the article is fed to the stock conveyor 51A by the distribution conveyor 31A, the third sensor S3A is turned on. Then, the CPU 71 drives the stock conveyor 51A for a preset period of time (which is longer than time required for the article moved on the stock conveyor 51A to reach the stopper wall 53A). As a result, the article is fed into between the stopper wall 53A and the gate 52A and then stocked there.

When the article on the first feed-in conveyor 21A-1 has reached a position of the sensor S0A and if an article is present on the second feed-in conveyor 21A-2, the first feed-in conveyor 21A-1 is kept stopped until the article on the second feed-in conveyor 21A-2 is fed out therefrom. Further, when the article on the second feed-in conveyor 21A-2 has reached a position of the first sensor S1A and if an article is present on the distribution conveyor 31A, the second feed-in conveyor 21A-2 is kept stopped until the article on the distribution conveyor 31A is fed out therefrom.

Thus, after the reading operation for all of the articles is completed, the customer depresses the step switch 16A. Then, the CPU 71 clears the read article file 86 and stops the conveyors 21A, 31A and 41A. After this, the customer goes to the settlement section 1. Then, the operator at the settlement section 1 settles the accounts of articles registered for the customer.

At this time, if articles are stocked in the stock section 50A, the operator directly takes out the stocked article, uses the touch scanner 94 to read the bar code of the article while confirming the customer's agreement, and then puts the article in the packaging section 50A. That is, the article is additionally registered.

However, if a large number of articles are stocked or if heavy articles are stocked and it is difficult to take out the article, the gate 52A is opened. Then, the CPU 71 drives the stock conveyor 51A and feed-out conveyor 41A and then stops the conveyors 51A and 41A when the fourth sensor S4A is turned on. As a result, the article stocked in the stock section 50A is fed from the stock conveyor 51A to the feed-out conveyor 41A and then stopped when it has reached a portion just beside the settlement section 1. Therefore, the operator takes up the article which has reached the portion just beside the settlement section 1 and uses the touch scanner 94 to read the bar code of the article while confirming the customer's agreement and then puts the article into the packaging section 60A.

In the settlement, the printer 96A is driven to issue a receipt of the registered articles and the operator hands it over to the customer and receives money. After the settlement, the customer goes to the packaging section 60A and puts the articles into a packaging bag.

Therefore, according to this embodiment, each time the article code of an article is read by the scanner 11A or 11B, article data of an article corresponding to the article code is read out from the article data file 85 and stored into the read article file 86. At the same time, when the weight of a first one of the articles fed by the feed-in conveyor 21A or 21B is measured by the weighing scale 22A or 22B, it is checked whether or not the same weight data as the weight data of the article measured by the weighing scale 22A or 22B is present in the read article file 86. If the same weight data is present, the measured article is fed to the feed-out conveyor 41A or 41B. If the same weight data is not present, the measured article is stocked in the stock section 50A or 50B. In this way, even if the same weight data is not present, the reading operation for a next article can be continuously effected and therefore the reading operation can be efficiently effected.

That is, even when the bar code cannot be correctly read because the customer is not accustomed to the reading operation or even when the bar code cannot be read because the bar code is damaged or stained, the reading operation for the next article can be continuously effected so that the reading operation can be efficiently effected. Further, the article data items of articles whose bar codes are read are maintained in read article file 86, the articles can be correctly registered even if the articles are fed in an order different from the order in which the articles are subjected to the reading operation.

Further, when it is detected from transaction time data that the article data is kept stored for a preset period in the read article file 86, this article data is deleted along with the transaction time data. Therefore, it is possible to quit purchasing articles whose bar codes are already read. In addition, if the article data of an article is deleted along with is transaction time data and another article of the same weight is put on the feed-in conveyor, the article on this conveyor is fed to the stock section. Accordingly, it is possible for the operator to find that a stocked article is different from the article whose bar code is read. If checking of such an operation is not required, the transaction time data may not be added to the article data. Further, the read article file 86 may be cleared by the start switch 15A, in place of the stop switch 16A.

In each of the above embodiments, the operation of checking whether or not the article fed by the feed-in conveyor 21A or 21B is coincident with the article read by the scanner 11A or 11B is effected by comparing the weight data previously stored for respective article with actual weight data measured by the weighing scale 22A or 22B, but the checking operation for checking whether or not the articles are coincident with each other is not limited to the above method. For example, the checking operation can be attained by storing shape data for respective articles, measuring the shape of an article on the feed-in conveyor 21A or 21B, and then comparing the measured shape data with the stored shape data.

When every article is packaged in a box, line-photosensors can be used to detect the lengths of an article in the feeding direction and the vertical direction while the article is fed by a feed-in conveyor. The line-photosensor is constituted by a light-emitting section disposed on one side of the feed-in conveyor and a light-receiving section disposed on the opposite side of the feed-in conveyor. The light-emitting section has light-emitting elements vertically arranged in one row, and the light-receiving section has light-receiving elements vertically arranged in a row. Each of the light-receiving elements receives a light-beam emitted from a corresponding one of the light-emitting elements. The length in the vertical direction is detected from the pitches of the light beams and the number of light beams interrupted by an article passing the line-photosensor. The length in the forward direction is detected from the feeding speed and the period in which the light-beams are interrupted by the article passing the line-photosensor. Three-dimensional data of articles dealt with the store are preset in a memory. An item of data is read out from the memory in accordance with the article code of an article read by a scanner, in order to determine the maximum lengths of the article in the vertical direction in the forward direction. When the lengths in the vertical direction and the forward direction are actually measured, it is checked whether or not these lengths are shorter than or equal to the maximum lengths. If yes, it is confirmed that an article whose article code is read is coincident with an article whose lengths in the vertical direction and the forward direction are measured.

What is claimed is:

1. A checkout apparatus comprising:

reading means for reading article codes of articles;

first feeding means for feeding the articles whose article codes are read by said reading means;

distributing means for distributing the articles fed from said first feeding means to one of first and second directions;

stock means for stocking the articles distributed in the second direction by said distributing means;

second feeding means for feeding the articles distributed in the first direction by said distributing means to a packaging area spaced from said stock means; and processing means for checking whether or not an article fed by said first feeding means coincides with an article whose article code is read by said reading means, and for controlling said distributing means so as to distribute an article fed from said first feeding means in the first direction when the checked articles coincide with each other and in the second direction when the checked articles do not coincide with each other;

wherein said second feeding means is positioned to define a customer's path set back from said stock means.

2. A checkout apparatus according to claim 1, wherein said processing means includes settlement means for effecting sales registration with respect to articles whose article codes are read by said reading means and which are fed into said packaging area, and to articles whose article codes are not read by said reading means and which are fed to said stock area.

3. A checkout apparatus according to claim 2, wherein said stock means includes feeding means arranged in parallel with said second feeding means, for feeding articles moved from said distributing means to said stock area.

4. A checkout apparatus according to claim 3, wherein said stock area is set near said settlement means.

5. A checkout apparatus according to claim 4, wherein said stock means further includes gating means for permitting articles which reach said stock area to be moved into said second feeding means.

6. A checkout apparatus according to claim 5, wherein said reading means includes first and second scanners each for reading article codes in the form of bar codes; said first feeding means includes first and second feed-in conveyors for feeding articles whose article codes are read by said first and second scanners; said distributing means includes first and second distributing conveyors for distributing articles fed from said first and second feed-in conveyors to one of said first and second directions; said second feeding means includes first and second feed-out conveyors for feeding articles distributed in said first direction by said first and second distributing conveyors; and said settlement means is disposed near said packaging area between said first and second feed-out conveyors.

7. A checkout apparatus according to claim 6, wherein said stock means further includes first and second stock conveyors disposed between said first and second feed-out conveyors, for feeding articles distributed in said second direction by said first and second distributing conveyors.

8. A checkout apparatus according to claim 2, wherein said settlement means includes memory means for storing article data of articles, and registering means for detecting that an article whose article code is read by said reading means coincides with an article fed by said first feeding means and for registering the article based on the article data read out from said memory means in accordance with the article code.

9. A checkout apparatus according to claim 8, wherein said registering means includes additional registration means for reading article codes of articles stocked in said stock area and for registering the stocked articles based on the article data read out from said memory means in accordance with the article codes.

10. A checkout apparatus according to claim 9, wherein said memory means includes a first memory; and said settlement means includes means for detecting the characteristic of articles fed by said first feeding means, and comparing means for comparing output data of said detecting means with characteristic data included in article data which is read out from said first memory in accordance with the article code read by said reading means.

11. A checkout apparatus according to claim 10, wherein said first memory stores weight data as said characteristic data, and said detecting means includes weighing means for measuring the weight of articles fed by said first feeding means.

12. A checkout apparatus according to claim 10, wherein said first memory stores shape data as said characteristic data, and said detecting means includes sensor means for measuring the shape of articles fed by said first feeding means.

13. A checkout apparatus according to claim 10, wherein said memory means includes a second memory for storing article data which is read out from said first memory in accordance with said the article code read by said reading means; and said comparing means includes checking means for searching said second memory for the same characteristic data as output data of said detecting means.

14. A checkout apparatus according to claim 13, wherein said registering means includes deleting means for adding time data to article data of an article to be stored in said second memory, said time data indicating the time at which the article code of the article is read, and for deleting article data kept stored in said second memory for a present period after reading of the article code.

15. A checkout apparatus according to claim 11, wherein said first feeding means includes a first feed-in conveyor for feeding articles whose article codes are read by said reading means, and a second feed-in conveyor for feeding articles moved from said first feed-in conveyor; said weighing means is disposed at a position corresponding to said second feed-in conveyor; and said processing means includes control means for stopping said first feed-in conveyor while an article is fed by said second conveyor.

16. A checkout apparatus according to claim 13, wherein said checking means includes means for deleting the article data corresponding to the same characteristic data from said second memory after the registration is effected based on the article data.

17. A checkout apparatus according to claim 13, wherein said checking means includes means for deleting all the article data stored in said second memory after registration is effected with respect to all the articles whose article codes are read.

18. A checkout apparatus comprising:

reading means for reading article codes of articles;

first feeding means for feeding the articles whose article codes are read by said reading means;

distributing means for distributing the articles fed from said first feeding means to one of first and second directions;

second feeding means for feeding the articles distributed in the first direction by said distributing means to a packaging area;

stock means for stocking the articles distributed in the second direction by said distributing means within a stock area separated from the packaging area; and processing means for checking whether or not an article fed by said first feeding means coincides with an article whose article code is read by said reading means, and for controlling said distributing means so as to distribute an article fed from said first feeding means in the first direction when the checked articles are coincident with each other and in the second direction when the checked articles are not coincident with each other;

said processing means including settlement means for effecting sales registration with respect to articles whose article codes are read by said reading means and which are fed into said packaging area, and to articles whose article codes are not read by said reading means and which are fed to said stock area;

said stock means further including feeding means arranged with said second feeding means, for feeding articles moved from said distributing means to said stock area;

said stock area being arranged near said settlement means; and said stock means including gating means for permitting articles which reach said stock area to be moved into said second feeding means.

19. A checkout apparatus according to claim 18, wherein said reading means includes first and second scanners each for reading article codes in the form of bar codes said first feeding means includes first and second feed-in conveyors for feeding articles whose article codes are read by said first and second scanners; said distributing means includes first and second distributing conveyors for distributing articles fed from said first and second feed-in conveyors to one of said first and second directions; said second feeding means includes first and second feed-out conveyors for feeding articles distributed in said first direction by said first and second distributing conveyors; and said settlement means is disposed near sad packaging area between said first and second feed-out conveyors.

20. A checkout apparatus according to claim 19, wherein said stock means further includes first and second stock conveyors disposed between said first and second feedout conveyors, for feeding articles distributed in said second direction by said first and second distributing conveyors.

21. A checkout apparatus comprising:

reading means for reading article codes of articles;

first feeding means for feeding the articles whose article codes are read by said reading means;

distributing means for distributing the articles fed from said first feeding means to one of first and second directions;

second feeding means for feeding the articles distributed in the first direction by said distributing means to a packaging area;

stock means for stocking the articles distributed in the second direction by said distributing means within a stock area separated from the packaging area; and processing means for checking whether or not an article fed by said first feeding means coincides with an article whose article code is read by said reading means, and for controlling said distributing means so as to distribute the article fed from said first feeding means in the first direction when the checked articles are coincident with each other and in the second direction when the checked articles are not coincident with each other;

said processing means including settlement means for effecting sales registration with respect to articles whose article codes are read by said reading means and which are fed into said packaging area, and to articles whose article codes are not read by said reading means and which are fed to said stock area; and said settlement means including memory means for storing article data of articles, and registering means for detecting that an article whose article code is read by said reading means coincides with an article fed by said first feeding means and for registering the article based on the article data read out from said memory means in accordance with the article code; said registering means including additional registration means for reading article codes of articles stocked in said stock area and for registering the stocked articles based on the article data read out from said memory means in accordance with the article codes.

22. A checkout apparatus according to claim 21, wherein said memory means includes a first memory; and said settlement means includes means for detecting means for detecting the characteristic of articles fed by said first feeding means, and comparing means for comparing output data of said detecting means with characteristic data included in article data which is read out from said first memory in accordance with the article code read by said reading means.

23. A checkout apparatus according to claim 22, wherein said first memory stores weight data as said characteristic data, and said detecting means includes weighing means for measuring the weight of articles fed by said first feeding means.

24. A checkout apparatus according to claim 22, wherein said first memory stores shape data as said characteristic data, and said detecting means includes sensor means for measuring the shape of articles fed by said first feeding means.

25. A checkout apparatus according to claim 22, wherein said memory means includes a second memory for storing article data which is read out from said first memory in accordance with said the article code read by said reading means; and said comparing means includes checking means for searching said second memory for the same characteristic data as output data of said detecting means.

26. A checkout apparatus according to claim 25, wherein said registering means includes deleting means for adding time data to article data of an article to be stored in said second memory, said time data indicating the time at which the article code of the article is read, and for deleting article data kept stored in said second memory for a present period after reading of the article code.

27. A checkout apparatus according to claim 23, wherein said first feeding means includes a first feeding conveyor for feeding articles whose article codes are read by said reading means, and a second feed-in conveyor for feeding articles moved from said first feed-in conveyor, said weighing means is disposed at a position corresponding to said second feed-in conveyor; and said processing means includes control means for stopping said first feed-in conveyor while an article is fed by said second conveyor.

28. A checkout apparatus according to claim 25, wherein said checking means includes means for deleting the article data corresponding to the same characteristic data from said second memory after the registration is effected based on the article data.

29. A checkout apparatus according to claim 25, wherein said checking means includes means for deleting all the article data stored in said second memory after registration is effected with respect to all the articles whose article codes are read.

*30. A checkout apparatus comprising:*

*first and second checkout lanes each having reading means for reading article codes of articles, and feeding means for feeding articles the respective article codes of which have been read by said reading means;*

*a single settlement means disposed between said first and second checkout lanes and spaced from said reading means in a downstream direction of said feeding means, for commonly performing a first settlement process on the article codes read by the reading means of said first checkout lane and a second settlement process on the article codes read by the reading means of said second checkout lane;*

*a space sized to accommodate an operator therein, and defined between said first and second checkout lanes adjacent said single settlement means, such that the reading means in said first and second checkout lanes are both simultaneously observable from said space and such that an operator can perform a settlement operation on articles transported thereto by the feeding means in both of said first and second checkout lanes without moving from said space.*

*31. A checkout apparatus according to claim 30 wherein said first and second checkout lanes are parallel to each other.*

*32. A checkout apparatus according to claim 30, wherein said settlement means includes a cash register having keyboard means for entering various commands and data, drawer means for receiving cash, and control means for controlling the keyboard means and the drawer means, wherein at least one of said keyboard means, said drawer means and said control means is commonly used for said settlement operation on articles in said first and second checkout lanes.*

* * * * *